No. 648,886. Patented May 1, 1900.
W. R. SMITH.
ICE TONGS OR GRAPPLE.
(Application filed Nov. 7, 1899.)
(No Model.)
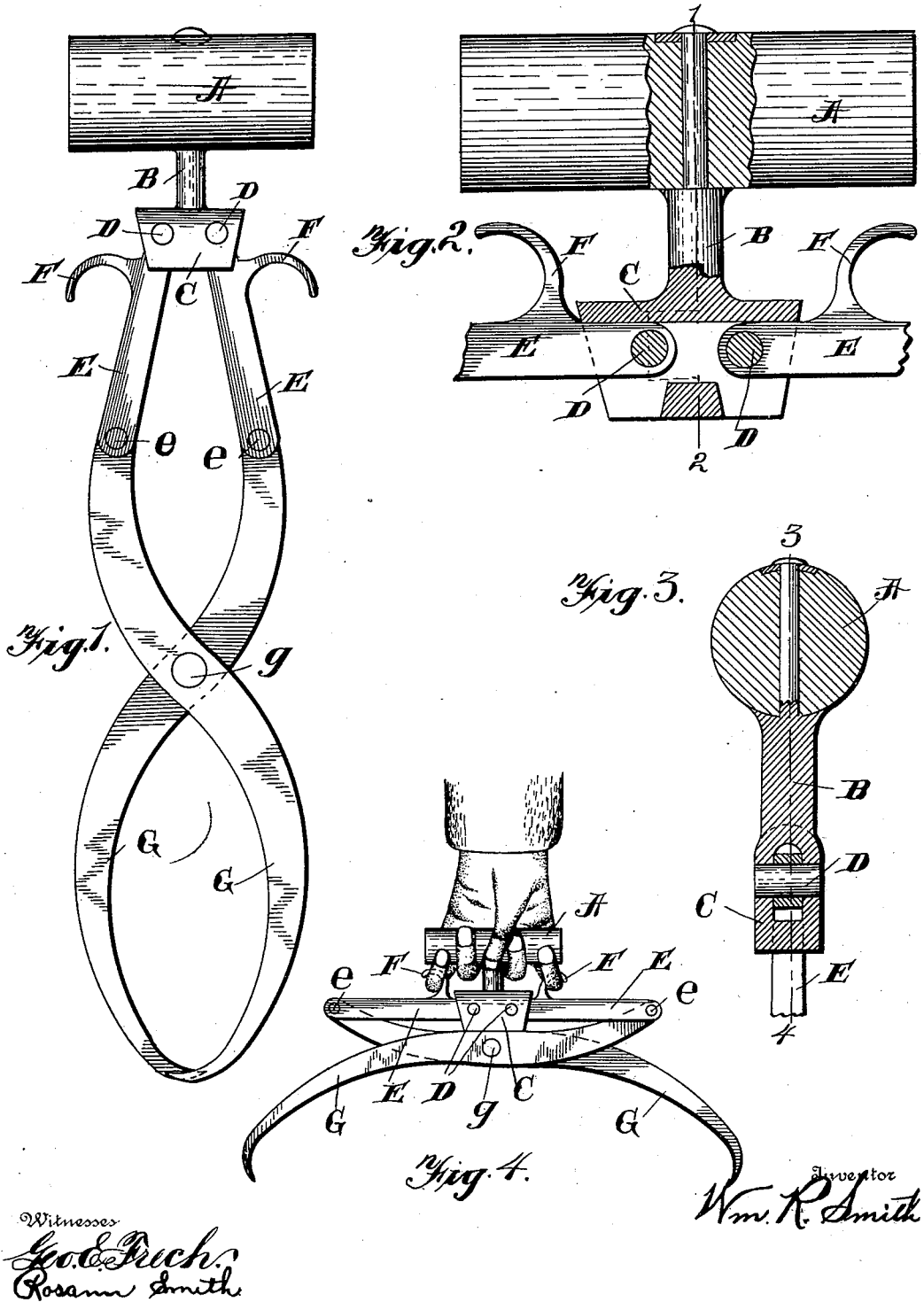

UNITED STATES PATENT OFFICE.

WILLIAM R. SMITH, OF NICHOLSON, KENTUCKY.

ICE TONGS OR GRAPPLE.

SPECIFICATION forming part of Letters Patent No. 648,886, dated May 1, 1900.

Application filed November 7, 1899. Serial No. 736,182. (No model.)

*To all whom it may concern:*

Be it known that I, WILLIAM R. SMITH, a citizen of the United States, residing at Nicholson, in the county of Kenton and State of Kentucky, have invented a new and useful Improvement in Ice Tongs or Grapples; and I do hereby declare that the following is a full, clear, and exact description of the invention, which will enable others skilled in the art to which it appertains to make and use it, reference being had to the accompanying drawings, which form part of this specification.

My invention relates to improvements in ice tongs or grapples; and it consists in the handle, the stem, and the handle-bar, made hollow at its lower end and provided with a stop to keep the upper ends of the arms separated, combined with the arms pivoted in the lower box-like portion of the stem and which are provided with hooks in which the fingers are made to catch for opening or closing the tongs and the tongs pivoted to the lower ends of the arms, as will be more fully described hereinafter.

The object of my invention is to provide the operating-arms with hooks by means of which the tongs can be opened to their widest extent and to provide the stem of the handle with a box-like projection in which the arms are pivoted.

In the accompanying drawings, Figure 1 is a side elevation of a pair of tongs or grapples to which my invention is applied. Fig. 2 is an enlarged detail view of the same, showing the box-like portion at the lower end of the same and in which the arms are pivoted. Fig. 3 is a vertical section taken upon the lines 1 2 of Fig. 2. Fig. 4 is a side elevation of the tongs, showing them opened to their full extent.

A represents the wooden handle, and B the stem, which is secured thereto at its upper end. The lower portion C of this stem is made hollow and box-like, and in this the two arms E are pivoted upon the pivots D. The upper portion of the box forms a stop for the upward movement of the arms E when the hooks F, attached to the arms, are drawn upward by the fingers. In the lower portion of the part C is formed a stop $d$, which serves to prevent the arms E from closing beyond a certain point and so that when they hang in their normal positions their lower ends will be inclined slightly outward from each other. Pivoted to the lower ends of the arms by means of the pivots $e$ are the tongs G, which are pivoted together at $g$.

In using the tongs or grapples the handle A is grasped by the hand and the first and little fingers are made to engage with the hooks F, as shown in Fig. 4, and by means of this the arms E are raised into horizontal positions, and the tongs G are extended to their utmost ready to engage with any desired object. The moment the fingers are disengaged from the hooks the tongs G drop from their own weight and assume the position shown Fig. 1. These hooks are a great convenience, for they enable a person to operate the hooks with a single hand, thus effecting a considerable saving in time and convenience.

Having thus described my invention, I claim—

1. In ice-tongs, the handle, the stem connected thereto, and the arms pivoted in the lower portion of the stem, and provided with the hooks F, combined with tongs G pivoted to the lower end of the arms, substantially as shown.

2. In ice-tongs, the handle, the stem secured thereto and having its lower end made hollow and provided with a stop $d$ and the arms E, the top of the box-like portion serving as stops for the upward movement of the arms E, combined with tongs G secured to the lower ends of the arms, substantially as described.

3. In ice-tongs, the tongs G, and the arms E connected to the upper end of the hooks, combined with a suitable support for the arms, and hooks secured to the arms with which the fingers of the operator engage for opening and closing the tongs, substantially as set forth.

WILLIAM R. SMITH.

Witnesses:
CHAS. B. REED,
I. GRIFFITH.